United States Patent
Tomasino et al.

[11] Patent Number: 6,126,999
[45] Date of Patent: Oct. 3, 2000

[54] URETHANE-ACRYLIC RUBBER COATING AND METHOD OF FORMING A VEHICLE BED LINER

[76] Inventors: Randolf R. Tomasino, 6184 S. U.S. Hwy. 231, Cloverdale, Ind. 46120; Gordon McKinnon, 190 Blanca Ave., Tampa, Fla. 33606

[21] Appl. No.: 09/092,836

[22] Filed: Apr. 13, 1998

Related U.S. Application Data

[60] Provisional application No. 60/087,247, May 29, 1998.

[51] Int. Cl.[7] .................................................. B05D 3/02
[52] U.S. Cl. ................................. 427/388.4; 427/426
[58] Field of Search ................... 427/388.4, 426

[56] References Cited

U.S. PATENT DOCUMENTS

| | | | |
|---|---|---|---|
| 3,661,622 | 5/1972 | Rogers | 117/75 |
| 3,684,758 | 8/1972 | Honig et al. | 260/29.6 |
| 4,013,614 | 3/1977 | Self | 260/40 |
| 4,282,123 | 8/1981 | Ilaria | 260/18 |
| 4,659,799 | 4/1987 | Nahas et al. | 528/73 |
| 4,692,382 | 9/1987 | Schmitt et al. | 427/407.1 |
| 5,021,507 | 6/1991 | Stanley et al. | 525/127 |
| 5,084,521 | 1/1992 | White | 523/436 |
| 5,096,962 | 3/1992 | Holmes-Farley et al. | 524/742 |
| 5,114,783 | 5/1992 | Hodnett, III | 428/217 |
| 5,169,922 | 12/1992 | Hille et al. | 528/75 |
| 5,254,395 | 10/1993 | Hodnet, III | 428/217 |
| 5,342,882 | 8/1994 | Goebel et al. | 524/832 |
| 5,436,112 | 7/1995 | Hsieh et al. | 430/253 |
| 5,502,101 | 3/1996 | Schwarte et al. | 524/460 |
| 5,532,025 | 7/1996 | Kinlen et al. | 427/388.1 |
| 5,739,194 | 4/1998 | Natesh et al. | 524/457 |
| 5,767,187 | 6/1998 | Lucas | 524/507 |

OTHER PUBLICATIONS

Encyclopedia of Chemical Technology, Kirk and Othmer, eds., vol. 7, p. 940, Feb. 17, 1994.

*Primary Examiner*—Shrive Beck
*Assistant Examiner*—Paul D. Strain
*Attorney, Agent, or Firm*—Frijouf, Rust & Pyle, P.A.

[57] ABSTRACT

A method of forming a resilient rubber-based coating is described. The first step of the method involves providing a water curable liquid rubber and a water-based acrylic polymer. Next, the rubber and acrylic polymer are combined to form a curing rubber-acrylic composite. This curing rubber-acrylic composite is applied onto the surface of a substrate and is allowed to completely cure at a temperature in the range of 35° F. to 110° F. to thereby form a rubber-based coating.

26 Claims, 2 Drawing Sheets

FIG. 2

URETHANE-ACRYLIC RUBBER COATING AND METHOD OF FORMING A VEHICLE BED LINER

CROSS-REFERENCE TO RELATED APPLICATION

This application claims benefit of United States Patent Provisional application 60/087,247 filed on May 29, 1998. All subject matter set forth in provisional application 60/087,247 filed on May 29, 1998 is hereby incorporated by reference into the present application as if fully set forth therein.

FIELD OF THE INVENTION

This invention pertains to a method of preparing a resilient rubber based coating. More specifically, the method involves combining a water-curable rubber composition with a water-based acrylic polymer to form a rubber-acrylic composite, applying the composite to a substrate, and allowing the composite to cure. The resulting coating is resilient, durable, adhering, and has a high coefficient of static friction. The coating is extremely resistant to chemical exposure and physical forces.

PRIOR ART STATEMENT

Molded truck bed liners have been a popular purchase item among truck bed owners. Molded truck liners are generally comprised of a variety of materials, including polyethylene chloride, polypropylene chloride, or polyvinyl chloride. They have been sold as providing an aesthetically pleasing appearance to vehicles, and as providing protection against mechanical, chemical, and elemental forces. However, molded truck bed liners possess qualities that are highly disadvantageous to both sellers and consumers. For sellers, it is very expensive to maintain a significant inventory of the voluminous pre-formed molded truck liners. For consumers, serious corrosion problems arise when water gets caught between the vehicle bed and the pre-made liner.

Others have tried to overcome these disadvantages by providing an adhesive protective coating directly onto the truck bed surface. U.S. Pat. No. 5,084,521 describes a liquid sprayable epoxy composition comprising a liquid epoxy resin, an effective reinforcing amount of fiber, an elastomeric component, and an amine containing epoxy curing agent capable of curing the composition at equal or greater than 40° F. temperatures wherein the cured product is light stable and has a hardness on the Shore D scale. Further described is a method of forming in situ a cured product such as a truck bed liner by spraying, brushing, or rolling the epoxy composition onto the substrate such as the truck bed, curing and forming the product on the substrate at a temperature of at least 40° F. temperature. The ratio of epoxy reactive groups to amine reactive groups ranges from 0.9 to 1.1:1. Further described is a technique of modifying the coating coefficient of friction by sand embedding between the induction period and cure set time of applied epoxy composition. Other compositions have been disclosed that can be applied to a substrate.

U.S. Pat. No. 5,739,194 discusses aqueous dispersions of urethane polymers and vinyl polymers (e.g., acrylics) that provide water-based coating compositions with good adhesion following humidity exposure. The dispersion is predominately urethane, and the polyurethane is made from a first and a second polyisocyanate, the first polyisocyanate having at least one open carbon chain greater than six carbon atoms in length between two isocyanate groups, preferably at least eight carbon atoms in length. The vinyl monomers are polymerized in the presence of the aqueously dispersed polyurethane.

U.S. Pat. No. 5,096,962 discloses a one-component adhesive for metal surfaces such as iron, zinc, copper, cadmium and their alloys that will cure upon contact with the metal surface. The adhesive composition includes an olefinically unsaturated monomer; an acidic compound; a sulfonyl-containing compound; and a compound containing a transition metal. The adhesive composition may also optionally contain additional polymeric materials and will cure rapidly upon contact with a metal surface to form an adhesive bond between metal surfaces. The adhesive composition avoids the use of halide-containing compounds which can be undesirable in certain applications.

U.S. Pat. No. 4,692,382 discloses a coating composition that has as its principal constituents an isocyanate terminated urethane containing material and a phosphatized polyepoxide essentially free of oxirane groups. The coating composition has excellent elongation and is particularly useful as a coating applied directly to metal. The coating composition is also useful as a primer in the preparation of multilayer coatings having good flexibility.

U.S. Pat. No. 5,114,783 relates to a coating system which forms a highly abrasion resistant, chemical resistant, impact resistant protective finish for a substrate. The coating system is based upon using two coatings of different characteristics but having excellent adhesion to one another. The outermost or surface coating layer is a highly cross-linked hard polymer, which is adhered to an underlying base coating layer of a compatible softer polymer. The outer hard polymer preferably comprises a highly crosslinked acrylic polymer, while the underlying softer polymer preferably comprises a crosslinked urethane polymer.

U.S. Pat. No. 3,661,622 discusses a method of improving resistance to corrosion of metal surfaces is disclosed, wherein said method comprises: (a) applying to the metal surface a composition comprising (1) a major amount (e.g. at least 75 weight percent) of a diixotropic, grease-like composition consisting essentially of a non-volatile diluent, an oil-soluble dispersing agent and an alkaline earth metal carbonate and (2) a minor amount (e.g. 0.1 to 25 weight percent) of a polymer, and (b) applying to the coated metal surface a conventional paint. An important feature is the use of the composition described in step (a) as a primer coating.

U.S. Pat. No. 5,532,025 provides a corrosion inhibiting composition. The composition comprises an intrinsically conductive polymer, e.g. polyaniline or polypyrrole, blended in a binder material, preferably a non-thermoplastic matrix, the blend being capable of adhering to a metal surface to provide enhanced corrosion resistance to the metal. The blend provides corrosion resistance in a variety of corrosive environments such as acidic, alkaline, and salt environments. A method for protecting metal surfaces from corrosive attack by applying the corrosion inhibiting composition is provided, as well as two component corrosion inhibiting coatings, corrosion inhibited thin films of metal adhered to an intrinsically conducting polymer containing substrate, and corrosion inhibited metal bilayers.

U.S. Pat. No. 4,282,123 discloses a two-component coating system comprising (A) a polyfunctional acid (dimer acid), low base strength amine (aniline), and high base strength amine (cyclohexylamine) adduct of a diglycidyl ether of bisphenol and (B) an organic diol reacted with 2 moles of a diisocyanate. The coating is particularly adapted for coating surfaces subject to high abrasion, e.g., railroad hopper cars.

U.S. Pat. No. 5,169,922 relates to coating compositions which are particularly suitable for the preparation of the basecoat for two-coat coatings of the basecoat/ clearcoat type, and which comprise organic diluents, at least one resin containing urethane and urea groups, and, where appropriate, other resins, pigments and other conventional additives in common use. The coating compositions according to the invention are those which comprise at least one resin containing urethane and urea groups, which resin is obtainable by reacting (a1) a compound having two hydroxyl groups reactive toward isocyanate groups, with (a2) an aliphatic and/or cycloaliphatic di-isocyanate to form a prepolymer (A) containing isocyanate groups, and by subsequently reacting the isocyanate groups of the prepolymer (A), at least in part, with (a3) an adduct produced from a (meth)acrylic ester, preferably an acrylic ester, and an aliphatic or cycloaliphatic compound containing at least two aminic hydrogen atoms, the adduct containing at least one active aminic hydrogen atom.

U.S. Pat. No. 5,254,395 relates to a coating system which forms a highly abrasion resistant, chemical resistant, impact resistant protective finish for a substrate. The coating system is based upon using two coatings of different characteristics but having excellent adhesion to one another. The outermost or surface coating layer is a highly crosslinked hard polymer, which is adhered to an underlying base coating layer of a compatible softer polymer. The outer hard polymer preferably comprises a highly crosslinked acrylic copolymer derived from at least 40 percent by weight of a multifunctional aliphatic acrylate monomer of three or more functional groups, while the underlying softer polymer preferably comprises a crosslinked aliphatic urethane acrylate copolymer and the multifunctional aliphatic acrylate monomer of three or more functional groups.

U.S. Pat. No. 5,436,112 provides novel ethylenically unsaturated urethane monomers and photoreactive compositions comprising such monomers as essential constituents. The monomers can be photopolymerized or photo-crosslinked and are useful in coating systems and multilayer color proofing systems. Additionally, they offer superior advantages such as significantly reduced migration between layers in multilayer color proofing systems.

U.S. Pat. No. 5,021,507 discloses the addition to urethane prepolymers of low molecular weight polymers formed from ethylenically unsaturated monomers which do not contain active hydrogen to provide a hot melt adhesive which can be readily coated at a viscosity of 3000 to 50,000 cps. at 120° C. without the need for additional tackifiers or plasticizers and which has improved initial cohesive strength as well as improved strength after aging of the cured bond. In a preferred embodiment of the invention, the ethylenically unsaturated monomers are polymerized in the non-isocyanate containing components of the isocyanate terminated prepolymer.

None of these inventions possess the advantageous properties of the present invention.

It is therefore an object of the present invention to provide a vehicle bed liner in situ that effectively adheres to an underlying substrate under mechanical, chemical, and elemental stresses.

It is further an object of the present invention to provide a vehicle bed liner in situ that maintains its structural integrity when placed under mechanical, chemical, or elemental stresses.

It is further an object of the present invention to provide a rubber urethane based coating comprised of a rubber urethane and an acrylic, wherein the urethane-acrylic coating provides a vehicle bed liner.

It is further an object of the present invention to provide a rubber urethane based coating that can be sprayed onto a vehicle bed and then cured to provide a vehicle bed liner.

It is further an object of the present invention to provide a spray gun spray nozzle which will allow for effective application of a urethane based coating to a vehicle bed to thereby provide an effective vehicle bed liner.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention and the detailed description describing the preferred embodiment of the invention.

SUMMARY OF THE INVENTION

The present invention is defined by the appended claims, with specific embodiments being shown in the attached drawings. For the purpose of summarizing the invention, the invention relates to a method of forming a resilient rubber-based coating. First, a water-curable liquid rubber and a water-based acrylic polymer are provided. The water-curable liquid rubber and the water-based acrylic polymer are then combined to form a curing rubber-acrylic composite. This curing composite is applied onto a substrate and is allowed to completely cure at a temperature in the range of 35F to 110° F., thereby forming the rubber-based coating. The curing rubber-acrylic composite may be applied to the vehicle bed with a spray gun with a spray nozzle, the spray nozzle containing from 4 to 9 orifices. The substrate to which the composite is applied may be selected from any one of the group consisting of metal, wood, rubber urethane-based coatings, acrylic, cement, and plastic. The composite may be applied so as to ultimately produce a based coating with a thickness in the range of 1 to 15 millimeters. The weight ratio of rubber to acrylic polymer in the curing rubber-acrylic composite is in the range of 30:1 to 15:1; alternatively the weight ratio of rubber to acrylic polymer in the curing urethane-acrylic composite may be in the range of 28:1 to 23:1. Further, the curing rubber-acrylic polymer composite may comprise from 2.22 to 4.44 per cent acrylic by weight; the liquid rubber may be selected from the group consisting of aliphatic and aromatic isocyanates, natural rubbers, recycled rubbers, styrene butadiene, polybutadiene, polyisoprene, ethylene propylene, chloroprene, acrylonitrile-butadiene, ethylene-propylene, chloroprene, acrylonitrile-butadiene, ethylene-propylenediene monomer, and isopreneisobutylene—most preferably aliphatic or aromatic isocyanates; the water-based acrylic polymer may further comprise a defoamer, an acrylic accelerator, and a non-skid agent.

Another embodiment of the invention pertains to a method of forming a vehicle bed liner in situ. The method first involves providing a water-curable liquid rubber and a water-based acrylic polymer. Next, the rubber and acrylic polymer are combined to form a curing rubber-acrylic composite. This composite is applied to a vehicle bed. Prior to application, the bed may be cleaned and scuffed. The applied composite is then allowed to completely cure at a temperature in the range of 35° F. to 110° F. to thereby form a vehicle bed liner. The liner may have a thickness in the range of 1 to 15 millimeters. The liquid rubber is selected from the group consisting of aliphatic and aromatic isocyanates, natural rubbers, recycled rubbers, styrene butadiene, polybutadiene, polyisoprene, ethylene propylene, chloroprene, acrylonitrile-butadiene, ethylene-propylene, chloroprene, acrylonitrile-butadiene, ethylene-propylenediene monomer, and isopreneisobutylene—most preferably aliphatic and aromatic isocyanates. The water-based acrylic polymer may comprise any number of additives selected from the group comprising defoamers, acrylic accelerators, non-skid agents, bubble release compounds, and pigments. The acrylic polymer may be comprised of at least two acrylic polymer compositions.

Another embodiment of the invention pertains to a method of forming a vehicle bed liner in situ. The method first involves providing a water-curable liquid rubber and a water-based acrylic polymer. Next, the rubber and acrylic polymer are combined to form a curing rubber-acrylic composite. The weight ratio of rubber to acrylic polymer may be in the range of 30:1 to 15:1; most preferably the weight ratio is from 28:1 to 23:1. The composite may be comprised of from 2.22 to 4.44 percent acrylic polymer by weight. It is preferred that the viscosity of the rubber-acrylic composite immediately after combining the rubber and the acrylic polymer may be in the range of 10,000 to 30,000 poise. This composite is applied to a vehicle bed. It is preferred that the viscosity of the composite be in the range of 10,000 to 30,000 poise at the time it is applied. The applied composite is then allowed to completely cure at a temperature in the range of 35° F. to 110° F. to thereby form a vehicle bed liner.

Yet another embodiment of the present invention pertains to a method of forming a vehicle bed liner in situ. First, a water-curable liquid urethane polymer and a water-based acrylic polymer are provided. The acrylic polymer may be comprised of at least two acrylic polymer compositions. It is preferred that the liquid urethane be based on the group selected from aliphatic and aromatic isocyanates. The urethane and acrylic polymers are then combined to form a curing composite. The weight ratio of urethane to acrylic polymer in the composite is in the range of 30:1 to 15:1, preferably 28:1 to 23:1. Preferably the urethane-acrylic composite comprises from 2.22 to 4.44 percent acrylic by weight. It is preferred that the composite further have at least one additive selected from the group consisting of defoamers, acrylic accelerators, non-skid agents, bubble release compounds, and pigments. This composite is applied to a vehicle bed. The applied composite is then allowed to completely cure at a temperature in the range of 35F to 110° F. to thereby form a vehicle bed liner.

In this embodiment of the invention, it is preferred that the curing urethane-acrylic composite be applied to the vehicle bed with a spray gun that has a spray nozzle containing anywhere from four to nine orifices. Preferably, the orifices have a diameter within the range of 0.5 to 2.0 millimeters.

Another embodiment of the present invention pertains to a spray gun for administering a coating substance to a substrate, wherein the coating material has a viscosity in the range of 15,000 to 30,000 Poises. The spray gun further has a spray nozzle which contains from four to nine orifices. The orifices preferably have a diameter in the range of 0.5 to 2.0 millimeters.

Yet another embodiment of the present invention pertains to a rubber-based composition formed from a cured composite comprising a water-curable liquid rubber and a water-based acrylic polymer. The weight ratio of rubber to acrylic polymer in the urethane-acrylic composite is in the range of 30:1 to 15:1; preferably 28:1 to 23:1. The rubber-acrylic composite preferably comprises from 2.22 to 4.44 per cent acrylic polymer by weight. The liquid rubber is preferably selected from the group consisting of aliphatic and aromatic isocyanates, natural rubbers, recycled rubbers, styrene butadiene, polybutadiene, polyisoprene, ethylene propylene, chloroprene, acrylonitrile-butadiene, ethylene-propylene, chloroprene, acrylonitrile-butadiene, ethylene-propylenediene monomer, and isopreneisobutylene; most preferably from the group consisting of aliphatic and aromatic isocyanates. In one preferred form, the water-based acrylic polymer comprises at least two acrylic polymers.

In this embodiment, it is preferred that the rubber-based composition further comprise any number of additives selected from the group comprising defoamers, acrylic accelerators, non-skid agents, bubble release compounds, and colorants/pigments.

Another embodiment of the present invention pertains to a liquid urethane-based composition formed from a cured composite comprising a water-curable liquid rubber and a water-based acrylic polymer. The weight ratio of rubber to acrylic polymer in the urethane-acrylic composite is in the range of 30:1 to 15:1; preferably in the range of 28:1 to 23:1. The liquid urethane is preferably selected from the group consisting of aliphatic and aromatic isocyanates. The water-based acrylic polymer may be comprised of at least two acrylic polymers. Preferably, the urethane-acrylic composite comprises from 2.22 to 4.44 per cent acrylic polymer by weight.

In a preferred form of this embodiment, the composition further comprises any number of additives selected from the group comprising defoamers, acrylic accelerators, non-skid agents, bubble release compounds, and colorants.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated that the conception and the specific embodiments disclosed may be readily utilized as a basis for modifying or designing other structures for carrying out the same purposes of the present invention. It also should be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
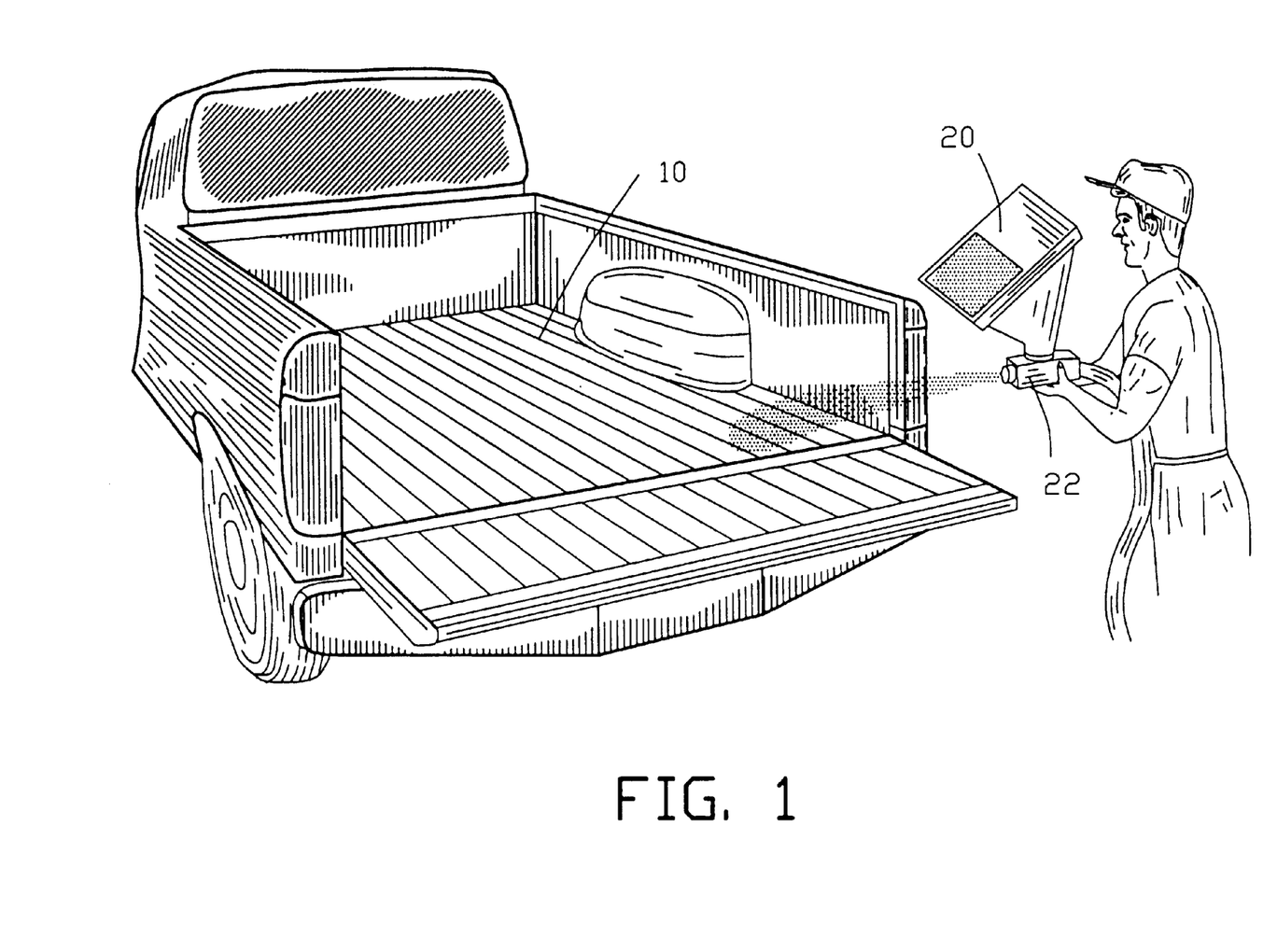
FIG. 1 shows a person spraying a curing urethane-acrylic composite onto the bed of a truck.
Figure 2:
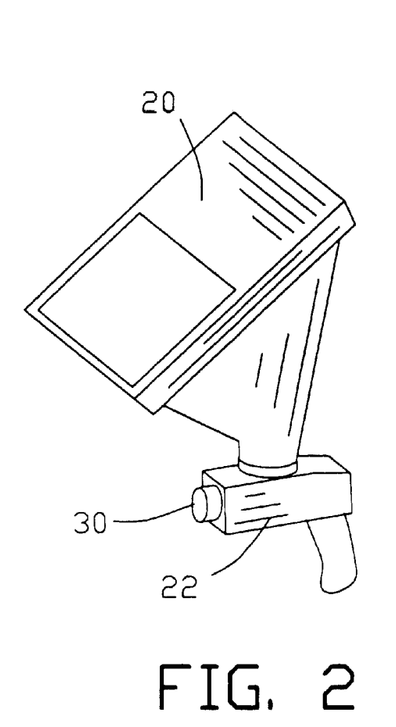
FIG. 2 is an enlarged view of a hopper gun employed with the present invention.
Figure 3:
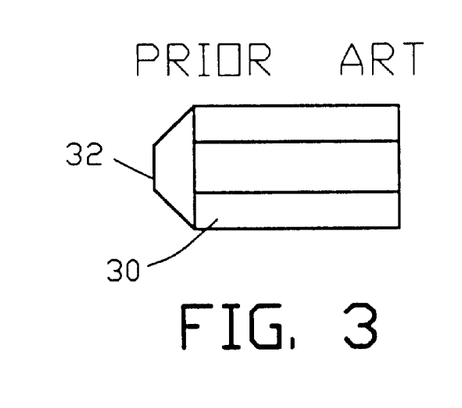
FIG. 3 is a side view of a conventional spray gun nozzle.
Figure 3A:
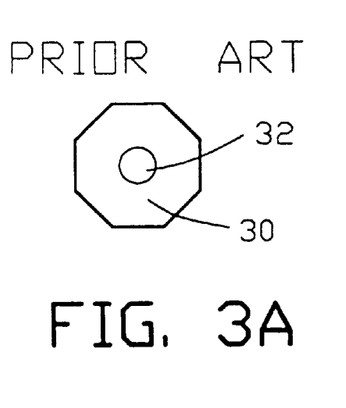
FIG. 3A is a front view of a conventional spray gun nozzle.
Figure 4:
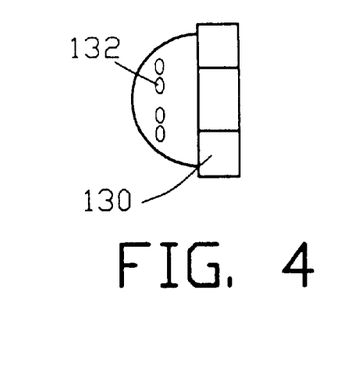
FIG. 4 is a side view of a spray nozzle of the present invention.
Figure 4A:
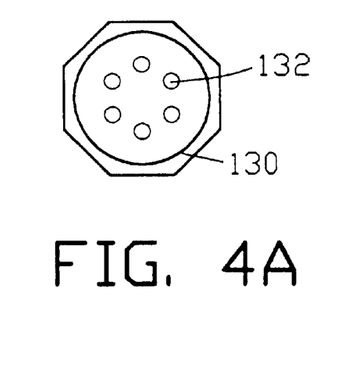
FIG. 4A is a side view of a spray nozzle of the present invention.

FIG. 1 illustrates one method of applying a composition of the present invention to a vehicle bed 10 by the use of a spray gun 20. In the preferred embodiment, a hopper gun 22 as shown in FIG. 2 is employed. FIG. 3 and FIG. 3A show a conventional spray gun nozzle 30. Conventionally, each nozzle has only one orifice 32. It was found that the conventional nozzle does not spray the urethane-acrylic composite of the present invention very well. FIG. 4 and FIG. 4A show a new spray gun nozzle 130 that allows for the effective spraying of the composition on a substrate. The preferred nozzle contains seven orifices 132 ranging in diameter from 0.3 mm to 2.0 mm. By varying the number of orifices, it was unexpectedly found that the cured composition surface gains a textured quality, and thus the surface frictional coefficient of the truck bed can be controlled. The number of holes on the nozzle can be increased or decreased. The orifices can vary in diameter from 0.5 to 2.0 millimeters. Preferably, the orifices have a diameter of approximately 0.7 millimeters. It was surprising that a curing polymeric composition could be effectively applied to a vehicle bed through a nozzle containing such small openings. Where the diameter of the holes was reduced to 0.5 millimeters, the curing coating material was not effectively applied to a substrate where the coating viscosity reached a level over 30,000 Poises. The hopper gun 22 contains a hopper bin 26 for containing the mixed urethane-acrylic composite. When an air line 34 is connected to the gun at the connector tip 36, continuous air flows from the spray gun tip 32, 132. When the trigger 40 is pulled, material mixed with the air flows through the nozzle. When the trigger is released, material flow stops.

Most generally, the present invention relates to a method of providing a resilient rubber urethane based coating. The first step of the method involves providing a water curable liquid rubber urethane and a water-based acrylic. The rubber based urethane is a moisture-cured, liquid applied polyurethane. The urethane may be either aliphatic or aromatic. Preferably it is based on aliphatic isocyanates. The rubber based urethane may be selected from any one of the group consisting of natural rubbers, recycled rubbers, styrene butadiene, polybutadiene, polyisoprene, ethylene propylene, chloroprene, acrylonitrile-butadiene, ethylene-propylene, chloroprene, acrylonitrile-butadiene, and ethylene-propylenediene monomer, isopreneisobutylene. Ideal liquid water-cure rubber urethanes include the aliphatic isocyanate-based SEAMCO-UR32, the aliphatic-aromatic isocyanate-based SEAMCO-UR36, and SEAMCO-UR40, although any liquid water-cure rubber urethane can function effectively. SEAMCO-UR32, SEAMCO-UR36, and SEAMCO-UR40 are trademarks of SEAMCO® Laboratories, Inc. located in Tampa, Florida. Further, any number of pigments may be added to the liquid rubber urethane to provide the desired vehicle bed liner color.

Any water-based acrylic can be used with the present invention. Preferably, SEAMCO-AC53. Alternatively, SEAMCO-AC57 can be used. The base polymer for this dispersion is a carboxyl-functional acrylic resin, which is neutralized with amine to form an anionic dispersion. The dispersion further comprises 42% acrylic resin, 3% triethylamine, 3% xylene, and 7% propoxyethanol. SEAMCO-AC53 and SEAMCO-AC57 are trademarks of SEAMCO® Laboratories, Inc, located in Tampa, Fla.

The water-based acrylic may contain a number of additives. For example, an acrylic accelerator may be added which will provide a harder acrylic. SEAMCO-AC57 provides an ideal additive. The acrylic may also contain a defoamer. Numerous defoamers are known in the art. Non-skid agents and bubble release compositions, also well-known in the art, may also be added to the acrylic. Color agents may also be added to the acrylic to contribute or create the desired color of the rubber urethane based coating or the truck bed liner.

Next, the water-cured liquid rubber urethane and the water-based acrylic are combined to form a curing urethane-acrylic composite. This curing composite is applied onto the surface of a substrate and is allowed to completely cure at a temperature in the range of 35° F. to 110° F. to thereby form a truck liner.

Addition organic solvents may be added to either the rubber urethane or the water-based acrylic to retard the cure rate of the urethane-acrylic composite. For example, the addition of one quart of xylene to either 10 quarts of rubber urethane or one quart acrylic prior to mixing will extend the setting time of the composite from 7 minutes to 22 minutes. Thus, the time period to apply the composite to a substrate is lengthened significantly.

Prior to the application of the curing urethane-acrylic composite, the substrate is cleaned of any oil or debris. The curing composite can be applied to a vehicle bed to thereby form a resilient vehicle bed liner. It can be effectively applied to wood, cement, and various plastic products. Of great significance is the composition's ability to adhere to itself. Thus, multiple coatings of the rubber urethane may be applied, or a fresh coating can be applied to a coating of compromised integrity.

The invention is explained in further detail in the examples below. All parts and percentages are parts and percentages by weight, unless expressly stated otherwise.

PREPARATION OF WATER-BASED ACRYLICS

EXAMPLE 1

A water-based acrylic for mixing with the water-curable liquid rubber urethane was prepared. 56.5 gallons of SEAMCO-AC53 were poured into a mixer. SEAMCO-AC53 is a trademark under SEAMCO® Laboratories, Inc., located in Tampa, Fla. SEAMCO-AC53 contains 47% acrylic polymer, and weighs 8.8 pounds per gallon. Absent coloring additives, the composition had a milky white appearance. Table 1 lists a number of chemical properties of SEAMCO-AC53.

TABLE 1

| | |
|---|---|
| pH | 9.5–10.5 |
| Viscosity | 60 CPS Max |
| Specific Gravity (Water = 1) | 1.0–1.2 |
| Melting Point | 0° C./32 °F. Water |
| Boiling Point | 100° C./212 °F. Water |
| Solubility in Water | Dilutable |
| Percent Volatile by Volume | 25–40 |

25 Gallons of water were then added to the tank. The materials were thoroughly mixed together to form the water-based acrylic SEAMCO NC12. SEAMCO NC12 is a trademark of SEAMCO® Laboratories, Inc., located in Tampa, Fla.

EXAMPLE 2

A water-based acrylic for mixing with the water-curable liquid rubber urethane was prepared. 55 gallons of SEAMCO-AC53 were poured into a mixing tank. 25 Gallons of water were then added to the tank, along with 1.5 gallons SEAMCO-AC57. SEAMCO-AC57 is a trademark of SEAMCO® Laboratories, Inc. located in Tampa, Florida. SEAMCO-AC57 is a milky acrylic dispersion of 42% solids in water with a weight of 8.53 pounds per gallon. The base polymer is a carboxyl-functional acrylic resin which is neutralized with amine to form an anionic dispersion. The solvent portion comprises 75% water, 14% 2-propoxyethanol, 6% xylene, and 5% triethylamine. Pigmenting compositions may also be added to SEAMCO-AC57. Table 2 lists a number of chemical properties of SEAMCO-AC57.

TABLE 2

| pH | 9.3–10.2 |
|---|---|
| Viscosity | 10–60 CPS Max |
| Specific Gravity (Water = 1) | 1.059 |
| Solubility in Water | Dilutable |

The materials were thoroughly mixed together to form the water-based acrylic SEAMCO NC14, also a Trademark of SEAMCO® Laboratories, Inc.

EXAMPLE 3

A water-based acrylic for mixing with the water-curable liquid rubber urethane was prepared. 550 gallons of SEAMCO-AC53 were poured into a steel mixing tank. 250 Gallons of water were then added to the tank, along with 15 gallons SEAMCO-AC57. Next, 1100 grams of TROYKYD D-126 bubble release composition were added to the mixture, as well as 28 fluid ounces of TEGO Foamex 3062. TROYKYD D126 is a product of Troy Chemical Company located in Newark, N.J. TEGO Foamex 3062 is a product of Tego Chemical Service GmbH located in Essen, Germany. The materials were thoroughly mixed together to form the water-based acrylic SEAMCO NC16, also a trademark of SEAMCO® Laboratories, Inc.

EXAMPLE 4

A water-based acrylic for mixing with the water-curable liquid rubber urethane was prepared. 5.7 gallons of SEAMCO-AC57 were poured into a mixing tank. 2.5 Gallons of water were then added to the tank. Next, 11 grams of TROYKYD D126 bubble release composition were added to the mixture, as well as 0.28 fluid ounces of TEGO Foamex 3062. The materials were thoroughly mixed together to form the water-based acrylic SEAMCO NC18, also a trademark of SEAMCO® Laboratories, Inc.

CREATING THE CURING URETHANE-ACRYLIC COMPOSITE AND APPLYING TO A METAL SUBSTRATE

EXAMPLE 5

12 quarts of SEAMCO-UR32 water curable liquid rubber urethane was added to a polyethylene bucket. SEAMCO-UR32 is a trademark of SEAMCO® Laboratories, Inc. located in Tampa, Fla. SEAMCO-UR32 is a liquid aliphatic polyurethane product containing 78% by weight solid polyurehane and the remainder naptha, with trace amounts of residual toluene diisocyanate. Table 3 contains a number of chemical properties of SEAMCO-UR32.

TABLE 3

| Physical State | Liquid |
|---|---|
| Vapour Density (Air = 1) | >1.0 |
| Boiling Point | 330–550 F. |
| Specific Gravity | 1.15 lbs @ 25 C |
| Weight Per Gallon | 9.50 pounds |
| Viscosity | 40 Poises |

Next, 1 quart of SEAMCO NC12 produced in EXAMPLE 1 was added to the liquid rubber urethane and the two compositions were mixed to form a curing urethane-acrylic composite. On adding the water-based acrylic, the rubber urethane begins to cure. The composite contains approximately 71% urethane and 2.4% acrylic. The weight ratio of rubber to acrylic was 30:1. The composite was then transferred to a hopper of a hopper spray gun, and the composition was applied to a metal substrate. Within 7 minutes of mixing, the composite completely cured, thereby forming a 2 millimeter urethane-based layer on the substrate. The layer strongly adhered to the metal substrate. The white coated surface was durable and resilient, having a hardness of 22. The surface had a coefficient of static friction of 0.68 as measured by an ASM 725 slip meter, and thus was not slippery. The coefficient of static friction was tested by American Standard Testing Measures C1028-89.

EXAMPLE 6

10 quarts of SEAMCO-UR32 water curable liquid rubber urethane were added to a polyethylene bucket. Next, 1 quart of SEAMCO NC12 was added to the liquid rubber urethane and the two compositions were mixed to form a curing urethane-acrylic composite. On adding the water-based acrylic, the rubber urethane began to cure. The composite contained approximately 66% urethane and 3.9% acrylic. The weight ratio of rubber to acrylic was 15:1. The composite was then transferred to a hopper of a hopper spray gun, and the composition was applied to a metal substrate with a thickness across the substrate of approximately 7 millimeters. Within 7 minutes of mixing, the composite completely cured, thereby forming a urethane-based layer on the substrate. The layer strongly adhered to the metal substrate. The white coated surface was durable and resilient, having a hardness of 22. The surface had a coefficient of static friction of 0.68 as measured by an ASM 725 slip meter, and thus was not slippery.

EXAMPLE 7

6 quarts of SEAMCO-UR32 water curable liquid rubber urethane were added to a polyethylene bucket. Next, 1 quart of SEAMCO NC12 was added to the liquid rubber urethane and the two compositions were mixed to form a curing urethane-acrylic composite. On adding the water-based acrylic, the rubber urethane began to cure. The composite contained approximately 66% urethane and 3.9% acrylic. The weight ratio of rubber to acrylic was 15:1. The composite was then transferred to a hopper of a hopper spray gun, and the composition was applied to a metal substrate with a thickness across the substrate of approximately 3 millimeters. Within 7 minutes of mixing, the composite completely cured, thereby forming a urethane-based layer on the substrate. The layer strongly adhered to the metal substrate. The white coated surface was durable and resilient, having a hardness of 22. The surface had a coefficient of static friction of 0.68 as measured by an ASM 725 slip meter, and thus was not slippery.

EXAMPLE 8

12 quarts of SEAMCO-UR32 water curable liquid rubber urethane was added to a polyethylene bucket. Next, 1 quart of SEAMCO NC14 produced in EXAMPLE 2 was added to the liquid rubber urethane and the two compositions were mixed to form a curing urethane-acrylic composite. On adding the water-based acrylic, the rubber urethane began to cure. The composite contained approximately 71% urethane and 2.4% acrylic. The weight ratio of rubber to acrylic was 30:1. The composite was then transferred to a hopper of a hopper spray gun, and the composition was applied to a metal substrate. Within 7 minutes of mixing, the composite completely cured, thereby forming a 4 millimeter urethane-based layer on the substrate. The layer strongly adhered to the metal substrate. The white coated surface was durable and resilient, having a hardness of 20.8. The surface had a coefficient of static friction of 0.68 as measured by an ASM 725 slip meter, and thus was not slippery.

EXAMPLE 9

6 quarts of SEAMCO-UR32 water curable liquid rubber urethane was added to a polyethylene bucket. Next, 1 quart of SEAMCO NC14 produced in EXAMPLE 2 was added to the liquid rubber urethane and the two compositions were mixed to form a curing urethane-acrylic composite. On adding the water-based acrylic, the rubber urethane began to cure. The composite contained approximately 67% urethane and 3.9% acrylic. The weight ratio of rubber to acrylic was 15:1. The composite was then transferred to a hopper of a hopper spray gun, and the composition was applied to a metal substrate with a thickness across the substrate of approximately 1 millimeters. Within 7 minutes of mixing, the composite completely cured, thereby forming a urethane-based layer on the substrate. The layer strongly adhered to the metal substrate. The white coated surface was durable and resilient, having a hardness of 20. The surface had a coefficient of static friction of 0.68 as measured by an ASM 725 slip meter, and thus was not slippery.

EXAMPLE 10

12 quarts of SEAMCO-UR32 water curable liquid rubber urethane were added to a polyethylene bucket. Next, 1 quart of SEAMCO NC16 made in EXAMPLE 3 was added to the liquid rubber urethane and the two compositions were mixed to form a curing urethane-acrylic composite. On adding the water-based acrylic, the rubber urethane began to cure. The composite contained approximately 71.47% urethane and 2.38% acrylic. The weight ratio of rubber to acrylic was 30:1. The composite was then transferred to a hopper of a hopper spray gun, and the composition was applied to a metal substrate. Within 7 minutes of mixing, the composite completely cured, thereby forming a 2 millimeter thick urethane-based layer on the substrate. The layer strongly adhered to the metal substrate. The white coated surface was durable and resilient, having a hardness of 20.8. The surface had a coefficient of static friction of 0.68 as measured by an ASM 725 slip meter, and thus was not slippery.

EXAMPLE 11

11 quarts of SEAMCO-UR32 water curable liquid rubber urethane is added to a polyethylene bucket. Next, 1 quart of SEAMCO NC16 is added to the liquid rubber urethane and the two compositions are mixed to form a curing urethane-acrylic composite. On adding the water-based acrylic, the rubber urethane begins to cure. The composite contains approximately 71.05% urethane by weight. It containes approximately 2.58 percent acrylic by weight. The weight ratio of rubber urethane to acrylic is 28:1. The composite is then transferred to a hopper of a hopper spray gull, and the composition is applied to a metal substrate. Within 7 minutes of mixing, the composite completely cures, thereby forming a 1–7 millimeter thick urethane-based layer on the substrate. The layer strongly adhers to the metal substrate. The white coated surface has a hard texture that is not slippery.

EXAMPLE 12

10 quarts of SEAMCO-UR32 water curable liquid rubber urethane were added to a polyethylene bucket. Next, 1 quart of SEAMCO NC16 produced as in EXAMPLE 3 was added to the liquid rubber urethane and the two compositions were mixed to form a curing urethane-acrylic composite. On adding the water-based acrylic, the rubber urethane began to cure. The composite contained 70.48% rubber urethane and 2.81 percent acrylic, with a urethane to acrylic weight ratio of 25:1. The composite was then transferred to a hopper of a hopper spray gun, and was applied to a metal substrate. Within 7 minutes of mixing, the composite completely cured, thereby forming a urethane-based layer of approximately 3 millimeters thickness on the substrate. The composite material could not be applied to the substrate via spray gun effectively when the composite cured so as to become too viscous. The urethane-based layer adhered to the metal substrate. The white coated surface was durable and resilient, having a hardness of 21.0. The surface had a coefficient of static friction of 0.68 as measured by an ASM 725 slip meter, and thus was not slippery.

EXAMPLE 13

9 quarts of SEAMCO-UR32 water curable liquid rubber urethane are added to a polyethylene bucket. Next, 1 quart of SEAMCO NC16 is added to the liquid rubber urethane and the two compositions are mixed to form a curing urethane-acrylic composite. On adding the water-based acrylic, the rubber urethane begins to cure. The composite contains 69.83% rubber urethane and 3.10 percent acrylic, with a urethane to acrylic weight ratio of 23:1. The composite is then transferred to a hopper of a hopper spray gun, and is applied to a metal substrate. Within 7 minutes of mixing, the composite completely cures, thereby forming a urethane-based layer of approximately 1–7 millimeters thickness on the substrate. The composite material can not be applied to the substrate via spray gun effectively when the composite cures so as to become too viscous. The urethane-based layer adheres to the metal substrate. The white coating surface is durable and resilient and exhibits a high coefficient of friction.

EXAMPLE 14

8 quarts of SEAMCO-UR32 water curable liquid rubber urethane were added to a polyethylene bucket. Next, 1 quart of SEAMCO NC16 was added to the liquid rubber urethane and the two compositions were mixed to form a curing urethane-acrylic composite, as on adding the water-based acrylic, the rubber urethane began to cure. The composite contained approximately 69.01% urethane and 3.44% acrylic. The weight ratio of rubber to acrylic was 20:1. The composite was then transferred to a hopper of a hopper spray gun, and the composition was applied to a metal substrate. Within 7 minutes of nixing, the composite completely cured, thereby forming a 4 mm urethane-based layer on the substrate. The layer adhered to the metal substrate. The white coated surface was durable and resilient, having a hardness of 21.8. The surface had a coefficient of static friction of 0.68 as measured by an ASM 725 slip meter, and thus was not slippery.

EXAMPLE 15

7 quarts of SEAMCO-UR32 water curable liquid rubber urethane are added to a polyethylene bucket. Next, 1 quart of SEAMCO NC16 is added to the liquid rubber urethane and the two compositions are mixed to form a curing urethiane-acrylic composite. On adding the water-based acrylic, the rubber urethane begins to cure. The composite contains approximately 69.01% urethane and 3.88% acrylic. The weight ratio of rubber to acrylic is 17.5:1. The composite is then transferred to a hopper of a hopper spray gun, and the composition is applied to a metal substrate. Within 7 minutes of mixing, the composite completely cures, thereby forming a 1–7 mm urethane-based layer on the substrate. The layer strongly adheres to the metal substrate. The white coated surface is durable and resilient and exhibits a high coefficient of friction.

EXAMPLE 16

6 quarts of SEAMCO-UR32 water curable liquid rubber urethane were added to a polyethylene bucket. Next, 1 quart of SEAMCO NC16 was added to the liquid rubber urethane and the two compositions were mixed to form a curing urethane-acrylic composite, as on adding the water-based acrylic, the rubber urethane began to cure. The composite contained approximately 66.69% urethane and 3.91% acrylic. The weight ratio of rubber to acrylic was 15:1. The composite was then transferred to a hopper of a hopper spray gun, and the composition was applied to a metal substrate. Within 7 minutes of mixing, the composite completely cured, thereby forming a 5 mm urethane-based layer on the substrate. The layer strongly adhered to the metal substrate. The white coated surface was durable and resilient, having a hardness of 24. The surface had a coefficient of static friction of 0.68 as measured by an ASM 725 slip meter, and thus was not slippery.

EXAMPLE 17

12 quarts of SEAMCO-UR32 water curable liquid rubber urethane were added to a polyethylene bucket. Next, 1 quart of SEAMCO NC18 produced in EXAMPLE 4 was added to the liquid rubber urethane and the two compositions were mixed to form a curing urethane-acrylic composite. On adding the water-based acrylic, the rubber urethane began to cure. The composite contained approximately 71% urethane and 2.4% acrylic. The weight ratio of rubber to acrylic was 30:1. The composite was then transferred to a hopper of a hopper spray gun, and the composition was applied to a metal substrate. Within 7 minutes of mixing, the composite completely cured, thereby forming a 1 millimeter urethane-based layer on the substrate. The layer strongly adhered to the metal substrate. The white coated surface was durable and resilient, having a hardness of 18.6. The surface had a coefficient of static friction of 0.68 as measured by an ASM 725 slip meter, and thus was not slippery.

EXAMPLE 18

6 quarts of SEAMCO-UR32 water curable liquid rubber urethane were added to a polyethylene bucket. Next, 1 quart of SEAMCO NC18 was added to the liquid rubber urethane and the two compositions were mixed to form a curing urethane-acrylic composite. On adding the water-based acrylic, the rubber urethane began to cure. The composite contained approximately 67% urethane and 3.9% acrylic. The weight ratio of rubber to acrylic was 15:1. The composite was then transferred to a hopper of a hopper spray gun, and the composition was applied to a metal substrate with a thickness across the substrate of approximately 2 millimeters. Within 7 minutes of mixing, the composite completely cured, thereby forming a urethane-based layer on the substrate. The layer strongly adhered to the metal substrate. The white coated surface was durable and resilient, having a hardness of 18. The surface had a coefficient of static friction of 0.68 as measured by an ASM 725 slip meter, and thus was not slippery.

ADDITION OF SOLVENT TO THE COMPOSITE

An organic solvent may also be added to the urethane-acrylic composite to stunt the urethane-acrylic composite cure rate. The solvent may be added either to the rubber urethane composition or the water-based acrylic composition prior to mixing the rubber urethane and acrylic. Examples of solvents include but are not limited to xylene, naphtha, toluene, and mineral spirits.

EXAMPLE 19

1 quart of SEAMCO NC12 produced in EXAMPLE 1 is added to a polyethylene bucket. 1 quart of xylene is added to the NC12. Next, 12 quarts of SEAMCO-UR32 water curable liquid rubber urethane are added to the acrylic-xylene solution and the solution is mixed to form a curing urethane-acrylic composite. On combining the three components, the rubber urethane begins to cure. The composite contains approximately 67% urethane and 2.2% acrylic. The weight ratio of rubber to acrylic is 30:1. The composite is then transferred to a hopper of a hopper spray gun, and the composition is applied to a metal substrate. Within 22 minutes of mixing, the composite completely cures, thereby forming a 1–7 millimeter urethane-based layer on the substrate. The layer is strongly adhered to the metal substrate. The white coated surface is durable and resilient and exhibits a high coefficient of friction.

EXAMPLE 20

1 quart of SEAMCO NC12 is added to a polyethylene bucket. 1 quart of xylene is added to the NC12. Next, 6 quarts of SEAMCO-UR32 water curable liquid rubber urethane are added to the acrylic-xylene solution and the solution is mixed to form a curing urethane-acrylic composite. On combining the three components, the rubber urethane begins to cure. The composite contains approximately 61% urethane and 3.9% acrylic. The weight ratio of rubber to acrylic is 15:1. The composite is then transferred to a hopper of a hopper spray gun, and the composition is applied to a metal substrate. Within 22 minutes of mixing, the composite completely cures, thereby forming a 1–7 millimeter urethane-based layer on the substrate. The layer is strongly adhered to the metal substrate. The white coated surface is durable and resilient and exhibits a high coefficient of friction.

EXAMPLE 21

1 quart of SEAMCO NC14 produced in EXAMPLE 2 is added to a polyethylene bucket. 1 quart of xylene is added to the NC14. Next, 12 quarts of SEAMCO-UR32 water curable liquid rubber urethane are added to the acrylic-xylene solution and the solution is mixed to form a curing urethane-acrylic composite. On combining the three components, the rubber urethane begins to cure. The composite contains approximately 67% urethane and 2.2% acrylic. The weight ratio of rubber to acrylic is 30:1. The composite is then transferred to a hopper of a hopper spray gun, and the composition is applied to a metal substrate. Within 22 minutes of mixing, the composite completely cures, thereby forming a 7 millimeter urethane-based layer on the substrate. The layer is strongly adhered to the metal substrate. The white coated surface is durable and resilient and exhibits a high coefficient of friction.

EXAMPLE 22

1 quart of SEAMCO NC14 produced in EXAMPLE 2 is added to a polyethylene bucket. 1 quart of xylene is added to the NC14. Next, 6 quarts of SEAMCO-UR32 water curable liquid rubber urethane are added to the acrylic-xylene solution and the solution is mixed to form a curing urethane-acrylic composite. On combining the three components, the rubber urethane begins to cure. The composite contains approximately 59% urethane and 3.9% acrylic. The weight ratio of rubber to acrylic is 15:1. The composite is then transferred to a hopper of a hopper spray gun, and the composition is applied to a metal substrate. Within 22 minutes of mixing, the composite completely cures, thereby forming a 7 millimeter urethane-based layer on the substrate. The layer is strongly adhered to the metal substrate. The white coated surface is hard and resilient and exhibits a high coefficient of friction.

EXAMPLE 23

1 quart of SEAMCO NC16 produced in EXAMPLE 3 was added to a polyethylene bucket. 1 quart of xylene was added to the NC16. Next, 12 quarts of SEAMCO-UR32 water curable liquid rubber urethane were added to the acrylic-xylene solution and the solution was mixed to form a curing urethane-acrylic composite. On combining the three components, the rubber urethane began to cure. The composite contained approximately 67% urethane and 2.2% acrylic. The weight ratio of rubber to acrylic was 30:1. The composite was then transferred to a hopper of a hopper spray gun, and the composition was applied to a metal substrate. Within 22 minutes of mixing, the composite completely cured, thereby forming a 1 millimeter urethane-based layer on the substrate. The layer strongly adhered to the metal substrate. The white coated surface was durable and resilient, having a hardness of 27. The surface had a coefficient of static friction of 0.68 as measured by an ASM 725 slip meter, and thus was not slippery.

EXAMPLE 24

1 quart of SEAMCO NC16 produced in EXAMPLE 3 is added to a polyethylene bucket. 1 quart of xylene was added to the NC 16. Next, 11 quarts of SEAMCO-UR32 water curable liquid rubber urethane are added to the acrylic-xylene solution and the solution is mixed to form a curing urethane-acrylic composite. On combining the three components, the rubber urethane begins to cure. The composite contains approximately 71.05% urethane and 2.39% acrylic. The weight ratio of rubber to acrylic is 28:1. The composite is then transferred to a hopper of a hopper spray gun, and the composition is applied to a metal substrate. Within 22 minutes of mixing, the composite completely cured, thereby forming a 1–7 millimeter urethane-based layer on the substrate. The layer strongly adheres to the metal substrate. The white coated surface is durable and resilient and exhibits a high coefficient of friction.

EXAMPLE 25

1 quart of SEAMCO NC16 produced in EXAMPLE 3 was added to a polyethylene bucket. 1 quart of xylene was added to the NC16. Next, 10 quarts of SEAMCO-UR32 water curable liquid rubber urethane were added to the acrylic-xylene solution and the solution was mixed to form a curing urethane-acrylic composite. On combining the three components, the rubber urethane began to cure. The composite contained approximately 64.97% urethane and 2.59% acrylic. The weight ratio of rubber to acrylic was 25:1. The composite was then transferred to a hopper of a hopper spray gun, and the composition was applied to a metal substrate. Within 22 minutes of mixing, the composite completely cured, thereby forming a 4 millimeter urethane-based layer on the substrate. The layer was strongly adhered to the metal substrate. The white coated surface was durable and resilient, having a hardness of 25. The surface had a coefficient of static friction of 0.68 as measured by an ASM 725 slip meter, and thus was not slippery.

EXAMPLE 26

1 quart of SEAMCO NC16 produced in EXAMPLE 3 is added to a polyethylene bucket. 1 quart of xylene is added to the NC16. Next, 9 quarts of SEAMCO-UR32 water curable liquid rubber urethane are added to the acrylic-xylene solution and the solution is mixed to form a curing urethane-acrylic composite. On combining the three components, the rubber urethane begins to cure. The composite contains approximately 63.87% urethane and 2.83% acrylic. The weight ratio of rubber to acrylic is 23:1. The composite is then transferred to a hopper of a hopper spray gun, and the composition is applied to a metal substrate. Within 22 minutes of mixing, the composite completely cures, thereby forming a 1–7 millimeter urethane-based layer on the substrate. The layer strongly adheres to the metal substrate. The white coated surface is durable and resilient and exhibits a high coefficient of friction.

EXAMPLE 27

1 quart of SEAMCO NC16 produced in EXAMPLE 3 was added to a polyethylene bucket. 1 quart of xylene was added to the NC16. Next, 8 quarts of SEAMCO-UR32 water curable liquid rubber urethane were added to the acrylic-xylene solution and the solution was mixed to form a curing urethane-acrylic composite. On combining the three components, the rubber urethane began to cure. The composite contained approximately 63% urethane and 3.12% acrylic. The weight ratio of rubber to acrylic was 20:1. The composite was then transferred to a hopper of a hopper spray gun, and the composition was applied to a metal substrate. Within 22 minutes of mixing, the composite completely cured, thereby forming a 3 millimeter urethane-based layer on the substrate. The layer strongly adhered to the metal substrate. The white coated surface was durable and resilient, having a hardness of 21.6. The surface had a coefficient of static friction of 0.68 as measured by an ASM 725 slip meter, and thus was not slippery.

EXAMPLE 28

1 quart of SEAMCO NC16 produced in EXAMPLE 3 is added to a polyethylene bucket. 1 quart of xylene is added to the NC16. Next, 7 quarts of SEAMCO-UR32 water curable liquid rubber urethane are added to the acrylic-xylene solution and the solution is mixed to form a curing urethane-acrylic composite. On combining the three components, the rubber urethane begins to cure. The composite contains approximately 61% urethane and 3.5% acrylic. The weight ratio of rubber to acrylic is 17.5:1. The composite is then transferred to a hopper of a hopper spray gun, and the composition is applied to a metal substrate. Within 22 minutes of mixing, the composite completely cures, thereby forming a 7 millimeter urethane-based layer on the substrate. The layer is strongly adhered to the metal substrate. The white coated surface is durable and resilient and exhibits a high coefficient of friction.

EXAMPLE 29

1 quart of SEAMCO NC16 produced in EXAMPLE 3 was added to a polyethylene bucket. 1 quart of xylene was added to the NC16. Next, 6 quarts of SEAMCO-UR32 water curable liquid rubber urethane were added to the acrylic-xylene solution and the solution was mixed to form a curing urethane-acrylic composite. On combining the three components, the rubber urethane began to cure. The composite contained approximately 59% urethane and 3.9% acrylic. The weight ratio of rubber to acrylic was 15:1. The composite was then transferred to a hopper of a hopper spray gun, and the composition was applied to a metal substrate. Within 22 minutes of mixing, the composite completely cured, thereby forming a 6 millimeter urethane-based layer on the substrate. The layer strongly adhered to the metal substrate. The white coated surface was durable and resilient, having a hardness of 20.8. The surface had a coefficient of static friction of 0.68 as measured by an ASM 725 slip meter, and thus was not slippery.

EXAMPLE 30

1 quart of SEAMCO NC18 produced in EXAMPLE 4 is added to a polyethylene bucket. 1 quart of xylene is added to the NC18. Next, 12 quarts of SEAMCO-UR32 water curable liquid rubber urethane are added to the acrylic-xylene solution and the solution is mixed to form a curing urethane-acrylic composite. On combining the three components, the rubber urethane begins to cure. The composite contains approximately 67% urethane and 2.2% acrylic. The weight ratio of rubber to acrylic is 30:1. The composite is then transferred to a hopper of a hopper spray gun, and the composition is applied to a metal substrate. Within 22 minutes of mixing, the composite completely cures, thereby forming a 7 millimeter urethane-based layer on the substrate. The layer is strongly adhered to the metal substrate. The white coated surface has a hard texture that is not slippery.

EXAMPLE 31

1 quart of SEAMCO NC18 produced in EXAMPLE 4 is added to a polyethylene bucket. 1 quart of xylene is added to the NC18. Next, 6 quarts of SEAMCO-UR32 water curable liquid rubber urethane are added to the acrylic-xylene solution and the solution is mixed to form a curing urethane-acrylic composite. On combining the three components, the rubber urethane begins to cure. The composite contains approximately 59% urethane and 3.9% acrylic. The weight ratio of rubber to acrylic is 15:1. The composite is then transferred to a hopper of a hopper spray gun, and the composition is applied to a metal substrate. Within 22 minutes of mixing, the composite completely cures, thereby forming a 7 millimeter urethane-based layer on the substrate. The layer is strongly adhered to the metal substrate. The white coated surface has a hard texture that is not slippery.

APPLICATION OF THE CURING URETHANE-ACRYLIC COMPOSITE TO VARYING SUBSTRATES

EXAMPLE 32

The urethane-acrylic composite of EXAMPLE 25, with the addition of a red pigmented compound was applied to the metal surface of a cleaned truck bed with a hopper gun. The cured textured coating was 5 mm thick. The red vehicle liner was extremely tough, and was able to resist extreme mechanical forces (applied by loading and unloading heavy objects into the bed), without damage to its structural integrity, and had a hardness of 25. The surface had a coefficient of static friction of 0.68 as measured by an ASM 725 slip meter. Items placed in the back of the truck did not slide back and forth and bang against the sides of the truck when the truck was driven on a stop and go basis. The liner adhered extremely well to the truck bed surface. This experiment was duplicated over fifty times using varying pigments, and the results were similar for all tests.

EXAMPLE 33

A blade was used to gouge away portions of a bed liner from one of the liners of EXAMPLE 32. The Urethane-Acrylic Composite of EXAMPLE 25, with the addition of a pigment compound, was applied to the surface of the damaged truck bed liner via hopper gun. The resulting cured textured composite adhered to the damaged liner, and possessed the appearance of a new truck liner. Like the original liner of EXAMPLE 18, this truck liner was extremely tough, and was able to resist extreme mechanical forces (applied with a hammer), without damage to its structural integrity. The liner also had a relatively high coefficient of friction. Items placed in the back of the truck did not slide back and forth and bang against the sides of the truck when the truck was driven on a stop and go basis. The liner adhered extremely well to the compromised truck bed liner surface.

EXAMPLE 34

The urethane-acrylic composite of EXAMPLE 25 was painted onto a cleaned wooden surface. The cured composition was 2 mm thick. The coating was tough and adhesive. The coat surface was smooth, durable, and resilient, and exhibited a high coefficient of friction.

EXAMPLE 35

The urethane-acrylic composite of EXAMPLE 25 was applied to a cement surface via hopper gun. The resulting textured coating was durable and adhering. The coat surface was not slippery or brittle. The surface exhibited a high coefficient of friction.

EXAMPLE 36

The urethane-acrylic composite of EXAMPLE 25 was applied to a polyethylene surface via hopper gun. The resulting textured coating was durable and adhering. The coat surface was not slippery or brittle. The surface exhibited a high coefficient of friction.

ANTI-SKID AGAIN

EXAMPLE 37

An anti-skid agent, specifically strands of fiberglass filler, was added to the urethane composite of EXAMPLE 25 prior to applying the composite to the metal substrate. The resulting cured coating was adherent and durable, and possessed a surface with a higher frictional coefficient.

TESTING CURED COATINGS

EXAMPLE 38

The coated substrates of EXAMPLES 23–29, and a metal substrate coated with the urethane composite of example 25 with the addition of blue pigment were tested to determine their hardness and their resistance to mechanical, chemical, and elemental stresses. The samples were exposed to chemical reagents for a seven day period. Table 4 displays the results of these tests. Significantly, the coatings were not compromised by exposure to the tested chemcicals with the exception of bleach exposure. Bleach caused the non-pigmented coatings to amber slightly. Significantly however, the pimented coating was not affected by exposure to bleach. Surprisingly, battery acid did not affect the coating.

The samples shared a coefficient of static friction of 0.68 by american standard testing measures. The samples also had an adhesion of over 300 psi as tested by industrial standards. The samples were also placed inside of a QUV Box for 24 hours to test the effect of UV exposure on the coating. After 24 hours exposure to a 400W bulb, the samples only slightly ambered (a pigmented coating was not tested). This indicates that on 18 to 24 years of exposure to sunlight, the coating material will only slightly amber. These results indicate that the composition has properties ideal for a vehicle bed liner.

TABLE 4

| CHEMICAL | 23 | 24 | 25 | 25* | 26 | 27 | 28 | 29 |
|---|---|---|---|---|---|---|---|---|
| Acetone | – | – | – | – | – | – | – | – |
| Antifreeze | – | – | – | – | – | – | – | – |
| Automatic Transmissn Fluid | – | – | – | – | – | – | – | – |
| 8% Bleach | + | + | + | – | + | + | + | + |
| Brake Fluid | – | – | – | – | – | – | – | – |
| Citric Acid | – | – | – | – | – | – | – | – |
| Carbonic Acid | – | – | – | – | – | – | – | – |
| Corrosive Solution** | – | – | – | – | – | – | – | – |
| Lactic Acid | – | – | – | – | – | – | – | – |
| Sugar Water | – | – | – | – | – | – | – | – |
| Sulfuric Acid 38% | – | – | – | – | – | – | – | – |
| K4 Pyrophosphate | – | – | – | – | – | – | – | – |
| Vinegar | – | – | – | – | – | – | – | – |
| Xylene | – | – | – | – | – | – | – | – |

\* trace amounts of blue pigment added
\*\* aliphatic amine epoxy cure UN2735
– No effect
+ Slight ambering effect Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method of forming a resilient rubber based coating comprising:
   providing a water-curable liquid rubber;
   providing a water-based acrylic polymer;
   combining the water-curable liquid rubber and water-based acrylic polymer to form a curing rubber-acrylic composite with the weight ratio of rubber to acrylic in the curing rubber-acrylic composite being in the range of 28:1 to 23:1;
   applying a layer of the rubber-acrylic composite onto a substrate; and
   allowing the curing composite to completely cure at a temperature in the range of 35° F. to 110° F. to form a rubber based coating.

2. The method of forming a rubber based coating as set forth in claim 1, wherein the liquid rubber is selected from the group consisting of aliphatic and aromatic isocyanates, natural rubbers, recycled rubbers, styrene butadiene, polybutadiene, polyisoprene, ethylene propylene, chloroprene, acrylonitrile-butadiene, ethylene-propylene, chloroprene, acrylonitrile-butadiene, ethylene-propylenediene monomer, and isopreneisobutylene.

3. The method of forming a rubber based coating as set forth in claim 1, wherein the liquid rubber is a selected from the group consisting of aliphatic and aromatic isocyanates.

4. The method of forming a rubber based coating as set forth in claim 1, wherein the water-based acrylic polymer further comprises a defoamer, an acrylic accelerator, and a non-skid agent.

5. The method of forming a rubber based coating as set forth in claim 1, wherein the curing rubber-acrylic composite is applied to the vehicle bed with a spray gun with a spray nozzle, said spray nozzle containing from 4 to 9 orifices.

6. The method of forming a rubber based coating as set forth in claim 1, wherein the substrate is selected from the group consisting of metal, wood, rubber urethane-based coating, acrylic, cement, and plastic.

7. The method of forming a rubber-based coating as set forth in claim 1, wherein the rubber based coating has a thickness in the range of 1 to 15 millimeters.

8. A method of forming a vehicle bed liner in situ comprising:
   providing a water-curable liquid rubber;
   providing a water-based acrylic polymer;
   combining the liquid rubber and the acrylic polymer to form a curing rubber-acrylic composite with the weight ratio of rubber to acrylic in the curing rubber-acrylic composite being in the range of 28:1 to 23:1;
   applying the curing rubber-acrylic composition to a vehicle bed; and
   completely curing the composition at a temperature in the range of 35° F. to 110° F. to form a vehicle bed liner.

9. The method of forming a vehicle bed liner as set forth in claim 8, wherein the liner has a thickness in the range of 1 to 15 millimeters.

10. The method of forming a vehicle bed liner as set forth in claim 8, wherein the liquid rubber is selected from the group consisting of aliphatic and aromatic isocyanates, natural rubbers, recycled rubbers, styrene butadiene, polybutadiene, polyisoprene, ethylene propylene, chloroprene, acrylonitrile-butadiene, ethylene-propylene, chloroprene, acrylonitrile-butadiene, ethylene-propylenediene monomer, and isopreneisobutylene.

11. The method of forming a vehicle bed liner as set forth in claim 8, wherein the liquid rubber is a selected from the group consisting of aliphatic and aromatic isocyanates.

12. The method of forming a vehicle bed liner as set forth in claim 8, wherein the water-based acrylic polymer is selected from the group consisting of defoamers, acrylic accelerators, non-skid agents, bubble release compounds, and pigments.

13. The method of forming a vehicle bed liner as set forth in claim 8, wherein the water-based acrylic polymer further comprises an acrylic accelerator to harden the vehicle bed liner.

14. The method of forming a vehicle bed liner as set forth in claim 8, wherein the water-based acrylic polymer comprises at least two acrylic polymer compositions.

15. The method of forming a vehicle bed liner as set forth in claim 8, wherein the vehicle bed is cleaned and scuffed prior to applying the urethane-acrylic composition.

16. The method of forming a vehicle bed liner as set forth in claim 8, wherein the viscosity of the rubber-acrylic composite immediately after combining the rubber and water-based acrylic is in the range of 10,000 to 30,000 poise.

17. The method of forming a vehicle bed liner as set forth in claim 8, wherein the viscosity of the rubber-acrylic composite at application of the composite to the vehicle bed is in the range of 10,000 to 30,000 poise.

18. A method of forming a vehicle bed liner in situ comprising:

providing a water-curable liquid urethane polymer;

providing a water-based acrylic polymer;

combining the water-curable liquid urethane polymer and the water based acrylic polymer to form a curing urethane-acrylic composite;

applying the curing urethane-acrylic composition to a vehicle bed; and completely curing the composite at a temperature in the range of 35° F. to 110° F. to form a vehicle bed liner, wherein the weight ratio of urethane to acrylic in the urethane-acrylic composite is in the range of 28:1 to 23:1.

19. The method of forming a vehicle bed liner as set forth in claim 18, wherein the liquid urethane is selected from the group consisting of aliphatic and aromatic isocyanates.

20. The method of forming a vehicle bed liner as set forth in claim 18, wherein the composite further comprises a defoamer composition.

21. The method of forming a vehicle bed liner as set forth in claim 18, including an acrylic accelerator to harden the vehicle bed liner.

22. The method of forming a vehicle bed liner as set forth in claim 18, wherein the water-based acrylic polymer comprises at least two acrylic polymers.

23. The method of forming a vehicle bed liner as set forth in claim 18, including a non-skid agent.

24. The method of forming a vehicle bed liner as set forth in claim 18, wherein the water-based acrylic polymer is selected from the group consisting of defoamers, acrylic accelerators, non-skid agents, bubble release compounds, and pigments.

25. The method of forming a vehicle bed liner as set forth in claim 18, wherein the curing urethane-acrylic composite is applied to the vehicle bed with a spray gun with a spray nozzle, said spray nozzle containing from four to nine orifices.

26. The method of forming a vehicle bed liner as set forth in claim 25, wherein the orifices have a diameter ranging from 0.5 to 2 millimeters.

\* \* \* \* \*